United States Patent
Hsieh et al.

(10) Patent No.: US 10,810,078 B2
(45) Date of Patent: Oct. 20, 2020

(54) METHOD OF PARITY TRAINING FOR A DRAM SUPPORTING A LINK ERROR CHECKING AND CORRECTING FUNCTIONALITY

(71) Applicant: MEDIATEK INC., Hsin-Chu (TW)

(72) Inventors: Bo-Wei Hsieh, Hsin-Chu (TW); Chia-Yu Chan, Hsin-Chu (TW); Ching-Yeh Hsuan, Hsin-Chu (TW); Jou-Ling Chen, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/459,621

(22) Filed: Jul. 2, 2019

(65) Prior Publication Data

US 2020/0012558 A1 Jan. 9, 2020

Related U.S. Application Data

(60) Provisional application No. 62/693,495, filed on Jul. 3, 2018.

(51) Int. Cl.
| | | |
|---|---|---|
| G06F 11/10 | (2006.01) |
| G11C 29/52 | (2006.01) |
| G11C 29/04 | (2006.01) |
| H04L 1/00 | (2006.01) |
| H03M 13/00 | (2006.01) |
| H03M 13/11 | (2006.01) |
| G06F 9/30 | (2018.01) |

(52) U.S. Cl.
CPC ...... *G06F 11/1044* (2013.01); *G06F 9/30029* (2013.01); *G06F 11/1076* (2013.01)

(58) Field of Classification Search
CPC ............ G06F 11/1076; G06F 11/1044; G06F 9/30029; G06F 11/1048
See application file for complete search history.

(56) References Cited

U.S. PATENT DOCUMENTS

| 2009/0222707 | A1 | 9/2009 | Shin | |
|---|---|---|---|---|
| 2012/0011424 | A1* | 1/2012 | Schuette | G06F 11/1048 714/807 |
| 2014/0089755 | A1* | 3/2014 | Kantamsetti | G06F 11/1048 714/748 |
| 2017/0345480 | A1 | 11/2017 | Chen | |

FOREIGN PATENT DOCUMENTS

| CN | 102959639 A | 3/2013 |
|---|---|---|
| CN | 103337251 A | 10/2013 |
| CN | 107767919 A | 3/2018 |

OTHER PUBLICATIONS

"International Search Report" dated Oct. 8, 2019 for International application No. PCT/CN2019/094485, International filing date:Jul. 3, 2019.

* cited by examiner

*Primary Examiner* — Guy J Lamarre
(74) *Attorney, Agent, or Firm* — Winston Hsu

(57) ABSTRACT

A method of parity training for a dynamic random access memory, DRAM, is disclosed. The method comprises enabling a link error checking and correcting, ECC, functionality in a write operation of the DRAM, and remapping a parity function of a write parity pin to an data inversion function, a data replacing function, or a logical function, whereby data transferred to the DRAM through the write parity pin is used for indicating an inversion operation, a logical operation, or a substitution operation for data of a data pin.

10 Claims, 3 Drawing Sheets

WRITE pattern

| DQ pin | Data beat | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 12 |
| DQ0 | 0 | 1 | 1 | 1 | 1 | 1 | 1 | 1 | 1 | 0 | 0 | 0 | 0 | 0 | 0 | 0 |
| DQ1 | 0 | 0 | 1 | 1 | 1 | 1 | 1 | 1 | 1 | 1 | 0 | 0 | 0 | 0 | 0 | 0 |
| DQ2 | 0 | 0 | 0 | 1 | 1 | 1 | 1 | 1 | 1 | 1 | 1 | 0 | 0 | 0 | 0 | 0 |
| DQ3 | 0 | 0 | 0 | 0 | 1 | 1 | 1 | 1 | 1 | 1 | 1 | 1 | 0 | 0 | 0 | 0 |
| DQ4 | 0 | 0 | 0 | 0 | 0 | 1 | 1 | 1 | 1 | 1 | 1 | 1 | 1 | 0 | 0 | 0 |
| DQ5 | 0 | 0 | 0 | 0 | 0 | 0 | 1 | 1 | 1 | 1 | 1 | 1 | 1 | 1 | 0 | 0 |
| DQ6 | 0 | 0 | 0 | 0 | 0 | 0 | 0 | 1 | 1 | 1 | 1 | 1 | 1 | 1 | 1 | 0 |
| DQ7 | 0 | 0 | 0 | 0 | 0 | 0 | 0 | 0 | 1 | 1 | 1 | 1 | 1 | 1 | 1 | 1 |
| RDQS | 1 | 0 | 1 | 0 | 1 | 0 | 1 | 0 | 1 | 1 | 0 | 1 | 0 | 1 | 0 | 1 |

READ data

| DQ pin | Data beat | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 12 |
| DQ0 | 1 | 1 | 0 | 1 | 0 | 1 | 0 | 1 | 0 | 1 | 0 | 1 | 0 | 1 | 0 | 1 |
| DQ1 | 1 | 0 | 0 | 1 | 0 | 1 | 0 | 1 | 0 | 0 | 0 | 1 | 0 | 1 | 0 | 1 |
| DQ2 | 1 | 0 | 1 | 1 | 0 | 1 | 0 | 1 | 0 | 0 | 1 | 1 | 0 | 1 | 0 | 1 |
| DQ3 | 1 | 0 | 1 | 0 | 0 | 1 | 0 | 1 | 0 | 0 | 1 | 0 | 0 | 1 | 0 | 1 |
| DQ4 | 1 | 0 | 1 | 0 | 1 | 1 | 0 | 1 | 0 | 0 | 1 | 0 | 1 | 1 | 0 | 1 |
| DQ5 | 1 | 0 | 1 | 0 | 1 | 0 | 0 | 1 | 0 | 0 | 1 | 0 | 1 | 0 | 0 | 1 |
| DQ6 | 1 | 0 | 1 | 0 | 1 | 0 | 1 | 1 | 0 | 0 | 1 | 0 | 1 | 0 | 1 | 1 |
| DQ7 | 1 | 0 | 1 | 0 | 1 | 0 | 1 | 0 | 0 | 0 | 1 | 0 | 1 | 0 | 1 | 0 |

FIG. 3

METHOD OF PARITY TRAINING FOR A DRAM SUPPORTING A LINK ERROR CHECKING AND CORRECTING FUNCTIONALITY

CROSS REFERENCE TO RELATED APPLICATIONS

This application claims the benefit of U.S. Provisional Application No. 62/693,495, filed on Jul. 3, 2018 and entitled "ECC Parity Training Method", the contents of which are incorporated herein in their entirety.

BACKGROUND

Dynamic random access memory (DRAM) supports link error checking and correcting, link ECC, functionality for Read and Write operation, to recover the data even when errors are introduced either due to transmission or due to storage (charge loss) of data. As link ECC functionality is enabled, a data mask inversion (DMI) pin is used for reading the parity from the DRAM, and a read data strobe (RDQS) pin is used for writing the parity to the DRAM. In a word, the RDQS pin functions as parity function when Write Link ECC is enabled.

In order to arrive at the RDQS of the RDQS pin latch aligned with data (DQ) of the DQ pin for a DRAM controller to Read/Write from/to the DRAM, RDQS needs to be trained for phase alignment to the DQ. In the conventional parity training, Read and Write FIFO commands are applied for Read/Write the data from/to a FIFO file of the DRAM through the RDQS pin. In detail, the DRAM controller uses the Write FIFO command for writing the data to the FIFO file of the DRAM via the RDQS pin, and then reading back via the DMI pin with the Read FIFO command. With such manner, the DRAM controller repeats writing in and reading back until the data transferred to the DRAM via the RDQS pin is correct by adjusting the RDQS time, so as to complete the parity training.

As can be seen, the conventional parity training method requires extra FIFO file in the DRAM, and Read and Write FIFO are limited in length, so the training pattern cannot be complicated enough for the DRAM controller to optimize the latching point of the Write/Read parity bit.

SUMMARY

It is therefore an objective to provide a method of parity training for a DRAM supporting link ECC functionality in order to solve the abovementioned problems.

The present disclosure discloses a method of parity training for a dynamic random access memory, DRAM. The method comprises enabling a link error checking and correcting, ECC, functionality in a write operation of the DRAM, and remapping a parity function of a write parity pin to an data inversion function, a data replacing function, or a logical function, whereby data transferred to the DRAM through the write parity pin is used for indicating an inversion operation, a logical operation, or a substitution operation for data of a data pin.

The present disclosure further discloses a memory system. The memory system comprises a dynamic random access memory, DRAM, and a memory controller, used for enabling a link error checking and correcting, ECC, functionality in a write operation of the DRAM and remapping a parity function of a write parity pin to an data inversion function, a data replacing function, or a logical function, whereby data transferred to the DRAM through the write parity pin is used for indicating an inversion operation, a logical operation, or a substitution operation for data of a data pin.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram of a WRITE/READ operation of a DRAM according to an embodiment of the present disclosure.

DETAILED DESCRIPTION

Figure 1:
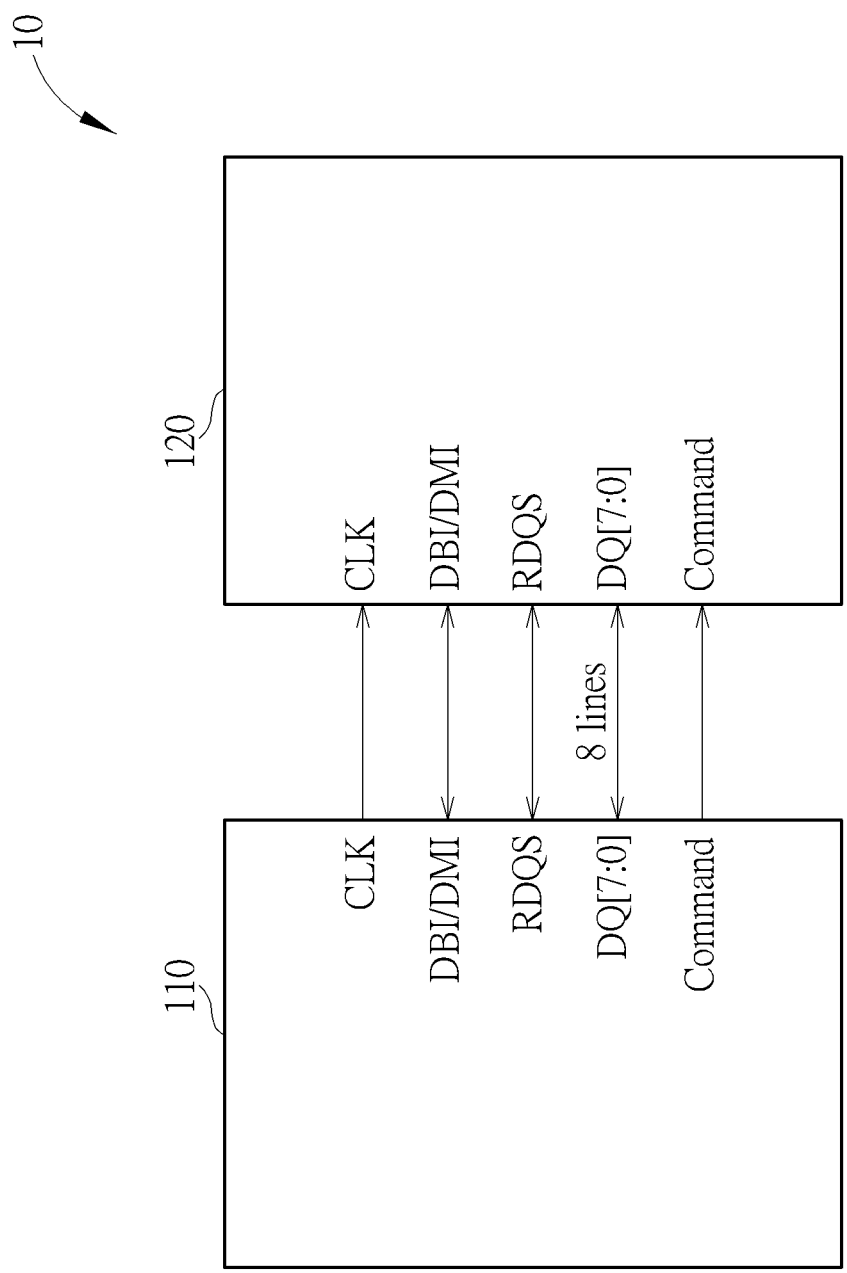
FIG. 1 is a schematic diagram of a memory system according to an embodiment of the present disclosure.

Please refer to FIG. 1, which is a schematic diagram illustrating a memory system 10 according to one embodiment of the present disclosure. The memory system 10 comprises the memory controller 110 and the DRAM 120. The memory controller 110 and the DARM 120 are connected via data bus for transmitting/receiving the command signal CMD, the differential clock signal CLK, the data bus inversion signal DBI, the data DQ[7:0], the data mask inversion signal DMI and the read data strobe signal RDQS. The memory controller 110 performs WRITE/READ operation with the DRAM 120 via corresponding pins, such as DQ pins, DMI pin and RDQS pin, to write/read the data bits DQ0-DQ7, DMI and the RDQS to/from the DRAM 120. The DRAM 120 supports the link error checking and correcting (ECC) functionality, and performs write parity pin training operation through a write parity pin, such as the RDQS pin, when the link ECC functionality is enabled in the WRITE operation.

As the link ECC functionality is enabled in the WRITE operation, the RDQS pin is used for writing parity bits to the DRAM 120. However, the data (parity bits) transfer to the DRAM 120 through the RDQS pin from the memory controller 110 is not written in the DRAM 120, such that the memory controller 110 cannot read back from the DRAM 120 via the DMI pin in the READ operation. As a result, the memory controller 110 cannot train the write parity pin (e.g. RDQS pin), which may affect Write/Read operation.

The present disclosure aims at providing parity training method as the RDQS pin functions as the write parity operation. In detail, during the write parity pin training operation, the RDQS pin does not function as the write parity operation, but a data inversion function, a data replacing function or a logical function.

In a word, the write parity pin training operation is performed by remapping the parity function of the RDQS pin to the following functions:

1. Data bits DQ[7:0] inversion operation (i.e. DMI/DBI);
2. Replace one of data bits DQ[7:0];
3. Other logical operation on partial or all of data bits DQ[7:0].

More specifically, the data (namely parity bits) transferred to the DRAM 120 through the RDQS pin is used for indicating whether to invert the data of the DQ pin(s), for indicating whether to perform a predetermined logical operation (e.g. AND, OR, NOT, NAND, NOR, XOR or XNOR operator) on the data of the DQ pin(s), or for indicating whether to replace the data of the DQ pin(s) with the data transferred to the DRAM 120 through the RDQS pin.

Figure 2:
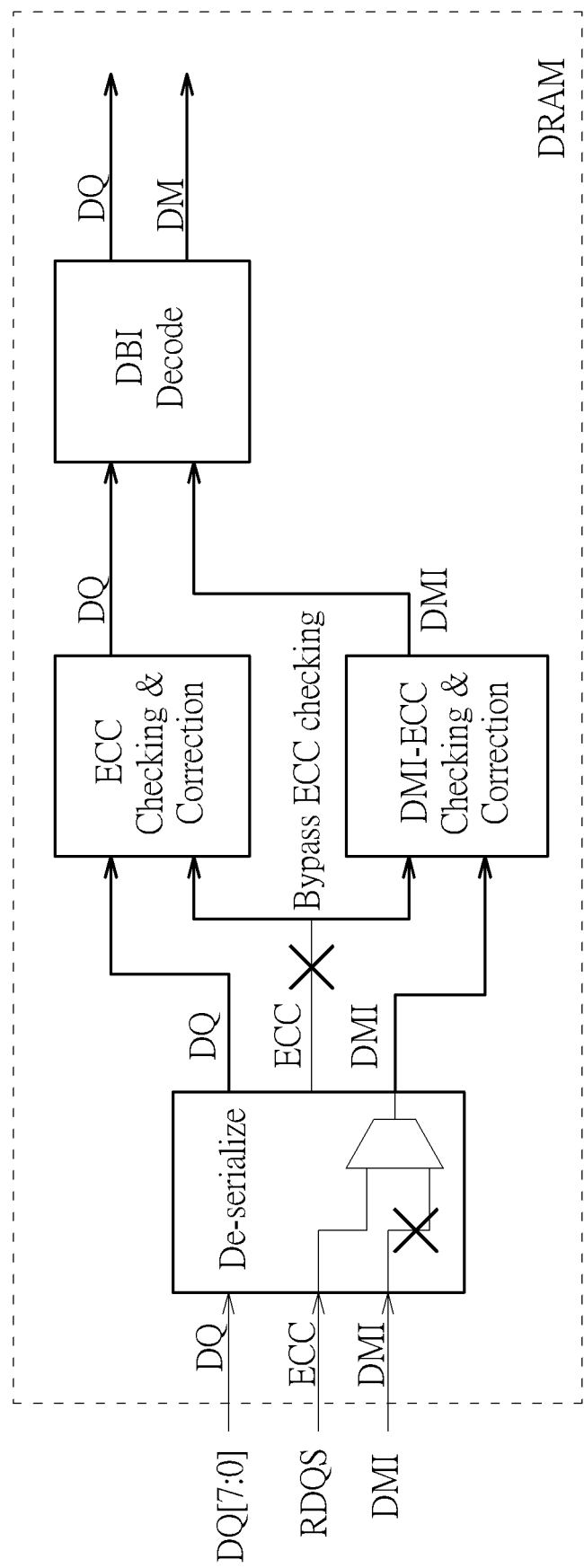
FIG. 2 is a schematic diagram of a DARM according to an embodiment of the present disclosure.

Reference is made to FIG. 2, which illustrates the operation of the DARM according to an embodiment of the present disclosure.

During the RDQS pin training, the data transferred to the DRAM through the RDQS pin is not treated as ECC parity but is re-mapped to the DMI operation for the data bits DQ[7:0]. As shown in FIG. 2, the data bits DQ[7:0], RDQS and DMI are transmitted to "De-serialize" block of the DRAM. Note that, the data transferred to the "De-serialize" block through the RDQS pin replaces the data of the DMI pin. Thus, data bits DQ[7:0] and DMI are transmitted to "DBI Decode" block for writing the inversed data bits DQ[7:0] to the DRAM. Note that, in other embodiments, the data transferred to the DRAM through the RDQS pin is re-mapped to the replacement operation or any logical operation for the data bits DQ[7:0] as long as the data (parity bits) transferred to the DRAM through the RDQS pin could be observed by reading the data bits DQ[7:0] back from the DRAM.

In an embodiment, the RDQS pin functions as the DMI operation for the data bits DQ[7:0] during the RDQS training. Reference is made to FIG. 3. The memory controller 110 uses DQ pins DQ0-DQ7 to write data bits (hereafter called WRITE pattern) to the DRAM 120 as shown in FIG. 3. Meanwhile, the memory controller 110 writes parity bits to the DRAM 120 with RDQS pin. Since the parity bits is considered as DMI operation for the written data of the DQ pins DQ0-DQ7, the WRITE pattern '0', '0', '0', '0', '0', '0', '0', '0' of the DQ pins DQ0-DQ7 in the first data beat "0" along with parity bit '1' of the RDQS pin in the first data beat "0" are written as '1', '1', '1', '1', '1', '1', '1', '1' to the DRAM. As shown in FIG. 3, when the memory controller 110 reads back the written data from the DRAM 120, the memory controller 110 knows the parity bit transfer to the DRAM 120 is '1' since the written data and the read data are inversed. In addition, the WRITE pattern '1', '0', '0', '0', '0', '0', '0', '0' of the DQ pins DQ0-DQ7 in the second data beat "1" along with parity bit '0' of the RDQS pin in the second data beat "1" are written as '1', '0', '0', '0', '0', '0', '0', '0' to the DRAM 120. Thus, when the memory controller 110 reads back the data from the DRAM 120, it knows the parity bit transfer to the DRAM 120 is '0' since the written data and the read data are the same. As can be seen, RDQS pin is re-mapped as DQ bus inversion function, and thus the WRITE pattern of RDQS pin can be read back by comparing the written data bits DQ[7:0] and the read data bits DQ[7:0], so as to realize RDQS pin training. In this embodiment, the WRITE pattern of the RDQS pin can be read back via DQ pins or DMI pins. Note that, DQ pin or DMI pins may keep the same function during READ operation whether the RDQS pin is remapped to other functions/operations or not.

In other embodiments, the RDQS pin functions as the data replacement operation or logical operation for the data bits DQ[7:0] during the RDQS training. For example, the WRITE pattern "1010101011010101" of the RDQS pin in data beat "0-15" is used for replacing the WRITE patter "0111111110000000" of the DQ pin DQ0 in data beat "0-15". Or, the WRITE pattern "1010101011010101" of the RDQS pin in data beat "0-15" is represented as a predetermined logical operation (e.g. AND, OR, NOT, NAND, NOR, XOR or XNOR operator) for the WRITE patter "0111111110000000" of the DQ pin DQ0 in data beat "0-15".

With such manner, the memory controller 110 is able to write/read the parity bits of the RDQS pin to/from the DRAM 120, so as to train the RDQS pin. In addition, the WRITE pattern of the RDQS pin can be as complicated as system requires, which is not limited by FIFO file size. Besides, the DRAM controller 110 can utilize the same training concept (i.e. function/operation remapping) for the DQ/DMI pin.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM).

In conclusion, the present disclosure discloses a method of performing parity training by remapping the ECC parity function of the RDQS pin to data inversion function, logical operator function, or data replacement function. Thus, the data carried on the RDQS pin could be written in the DRAM along with the data bits DQ[7:0], so that the DRAM controller can read the parity bits back from the DRAM for training the RDQS pin.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of parity training for a dynamic random access memory, DRAM, the method comprising:
    enabling a link error checking and correcting, ECC, functionality in a write operation of the DRAM; and
    remapping a parity function of a write parity pin to an data inversion function, a data replacing function, or a logical function, whereby data transferred to the DRAM through the write parity pin is used for indicating an inversion operation, a logical operation, or a substitution operation for data of a data pin.

2. The method of claim 1, wherein the write parity pin is a read data strobe, RDQS, pin.

3. The method of claim 1, wherein the data transferred to the DRAM through the write parity pin is used for indicating whether to invert the data of the data pin, for indicating whether to perform a predetermined logical operation on the data of the data pin, or for indicating whether to replace the data of the data pin with the data transferred to the DRAM through the write parity pin.

4. The method of claim 3, wherein the predetermined logical operation includes AND, OR, NOT, NAND, NOR, XOR or XNOR operator.

5. The method of claim 1, further comprising:
    reading the data transferred to the DRAM through the write parity pin back through the data pin or a data mask inversion, DMI, pin.

6. A memory system comprising:
    a dynamic random access memory, DRAM; and
    a memory controller, used for enabling a link error checking and correcting, ECC, functionality in a write operation of the DRAM and remapping a parity function of a write parity pin to an data inversion function, a data replacing function, or a logical function, whereby data transferred to the DRAM through the write parity pin is used for indicating an inversion operation, a logical operation, or a substitution operation for data of a data pin.

7. The memory system of claim 6, wherein the write parity pin is a read data strobe, RDQS, pin.

8. The memory system of claim 6, wherein the data transferred to the DRAM through the write parity pin is used for indicating whether to invert the data of the data pin, for indicating whether to perform a predetermined logical operation on the data of the data pin, or for indicating whether to replace the data of the data pin with the data transferred to the DRAM through the write parity pin.

9. The memory system of claim 8, wherein the predetermined logical operation includes AND, OR, NOT, NAND, NOR, XOR or XNOR operator.

10. The memory system of claim 6, wherein the memory controller is further used for reading the data transferred to the DRAM through the write parity pin back through the data pin or a data mask inversion, DMI, pin.

\* \* \* \* \*